UNITED STATES PATENT OFFICE.

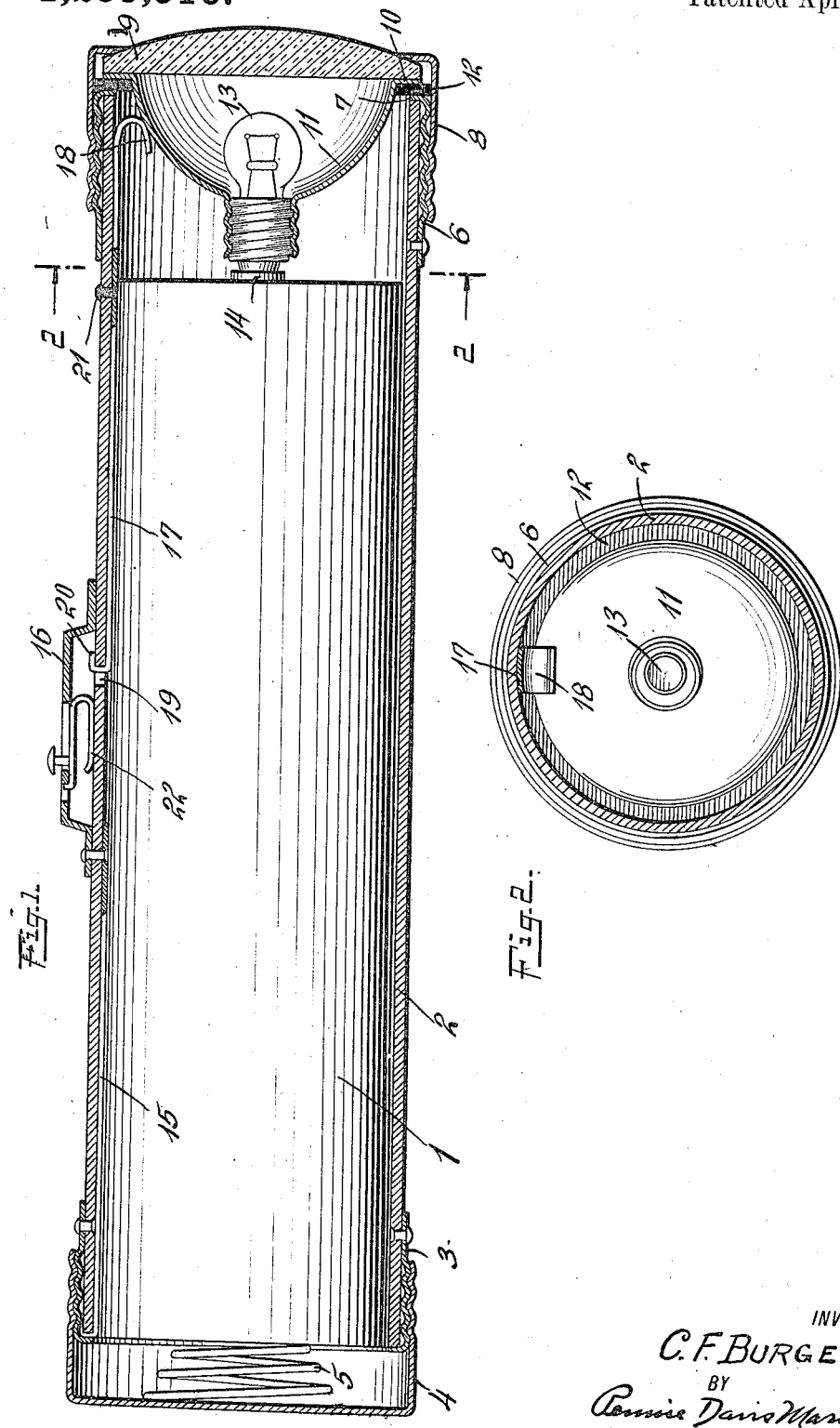

CHARLES F. BURGESS, OF MADISON, WISCONSIN, ASSIGNOR, BY MESNE ASSIGNMENTS, TO BURGESS BATTERY COMPANY, OF MADISON, WISCONSIN, A CORPORATION OF WISCONSIN.

BATTERY HAND-LAMP.

1,299,910.  Specification of Letters Patent.  Patented Apr. 8, 1919.

Application filed March 24, 1917. Serial No. 157,303.

*To all whom it may concern:*

Be it known that I, CHARLES F. BURGESS, a citizen of the United States, and residing in Madison, county of Dane, and State of Wisconsin, have invented certain new and useful Improvements in Battery Hand-Lamps; and I do hereby declare the following to be a full, clear, and exact description of the invention, such as will enable others skilled in the art to which it appertains to make and use the same.

The present invention relates to battery hand lamps or flash lights of a type adapted for carrying in the pocket and provided with a miniature lamp to which current may be delivered from the battery inclosed in the casing of the device.

It is an object of the present invention to provide means of the general character disclosed in my Patent No. 1,084,926, issued January 20, 1914, for protecting the lamp against accidental lighting by so inclosing certain parts of the electrical connections that accidental contact across the exposed metal parts of the device will not be effective to light the lamp.

For a more complete understanding of this and other objects and advantages of the invention, reference is made to the following description which is to be taken in conjunction with the accompanying drawings, wherein—

Figure 1 is a sectional elevation of a tubular hand lamp; and

Fig. 2 is a cross-section on the line 2—2 of Fig. 1.

In the embodiment illustrated in the drawings, the dry battery 1 consists of a plurality of dry cells arranged end to end in usual manner within a pasteboard tube. The battery is housed in a casing 2 here illustrated as comprising a tube of insulated material, preferably fiber, reinforced at its rear or bottom end with a threaded metal collar 3 to which is detachably secured an end cap 4 provided with a spiral spring 5, which bears against the naked bottom of the lowermost cell of the battery to establish electrical connection therewith. The other end of the tubular casing is reinforced with an exposed metal collar 6 having its outer edge bent to form an inturned stiffening flange 7 which overlaps the front end of the insulating tube. This collar has a screw thread pressed therein for engagement with a threaded lens holder 8 which may be of metal and shaped to engage the edge of a glass lens 9. The lens is seated on the peripheral flange 10 of a metal reflector 11 and a ring 12 of insulating material is interposed directly between flanges 7 and 10 to insulate the reflector from collar 6 and its attached lens holder 8. The incandescent lamp 13 is threaded into a tubular extension of the metal reflector and has its central terminal contacting with the central or carbon terminal 14 of the topmost cell of the battery. As a means for establishing electrical connection from the bottom of the battery to the lamp, I make use of a conductor 15 contacting with metal collar 3 and therefore connected with spring 5. This conductor 15 is riveted or otherwise suitably attached to a housing 16 mounted near the middle of the tubular casing. A second strip 17 has its front end bent inward and backward to form a contact finger 18 which yieldingly engages the curved exterior of the reflector. The other end of strip 17 is suitably anchored to casing 2 as by having its end passed outward through a slot 19 and then clenched down against the exterior of casing 2 to form a contact lug 20. Contact lug 20 is on the inside of housing 16 and so is not accessible for inadvertent connection with other exposed metal parts. Strip 17 may be further anchored as by means of a plug or rivet 21, preferably of insulating material, such as fiber.

The contact device whereby electrical connection may be established to conductor 17 when the lamp is to be lighted may be of the type disclosed and claimed in the patent to Maisel, No. 1,082,887, issued December 30, 1913. This device comprises a U-shaped strip of resilient metal having its inner leg 22 arranged to slide along the outer face of the fiber tube into and out of contact with lug 20. Other well known devices of proper construction may, of course, be used for completing the circuit between conductors 15 and 17.

With this arrangement of circuits, the outer terminal of lamp 13 is electrically connected with reflector 11 and conductor 17 but normally is insulated from all other parts of the device, and particularly is insulated from all exposed metal parts, and consequently an accidental lighting of the lamp by bridging its exposed metal parts is not possible.

To renew the batteries it is only necessary to unscrew cap 4, whereupon the batteries may be slipped out through the open bottom and new ones put in their place. If through corrosion or about the cap 4 should become irremovable from collar 3, it is possible to unscrew the lens holder and after taking out the lens, reflector and insulating ring 12, to straighten out finger 18 and then widthdraw the batteries through the front end of the casing.

I claim:—

1. In a hand lamp, the combination of an insulating tube of fiber, a battery therein, a threaded metal collar reinforcing the rear end of said tube, a cap threaded to said collar and closing the rear end of said tube, said cap being removable to permit removal of the battery through said rear end, a spring carried by said cap and engaging the bottom of said battery and establishing electrical connection therewith and with said cap, a lamp connected to the other end of said battery, a reflector into which said lamp is threaded, a threaded metal collar reinforcing the front end of said tube, an insulating ring on which said reflector seats, a lens for said lamp seated on said reflector, a holder for said lens threaded to said front collar and clamping said reflector and its insulating ring in position, a stationary conductive strip insulated from said front collar and from said lens holder and means controllable from approximately the center of said tube for electrically connecting said end cap to said strip when the lamp is to be lighted.

2. In a hand lamp, the combination of an insulating tube of fiber, a battery therein, a threaded metal collar reinforcing the rear end of said tube, a cap threaded to said collar and closing the rear end of said tube, said cap being removable to permit removal of the battery through said rear end, a spring carried by said cap and engaging the bottom of said battery and establishing electrical connection therewith and with said cap, a lamp connected to the other end of said battery, a reflector into which said lamp is threaded, a metal fitting at the front end of said tube, an insulating ring removably seated on said fitting and spacing said reflector therefrom, a lens for said lamp seated on said reflector, a holder for said lens threaded to said fitting and clamping said reflector and its insulating ring in position, and conductive means for connecting the spring at the bottom of said battery with said reflector when the lamp is to be lighted, said means including stationary longitudinal contact strips with an intervening switch.

In testimony whereof I affix my signature.

CHARLES F. BURGESS.